(12) United States Patent
Chadli et al.

(10) Patent No.: US 12,456,159 B1
(45) Date of Patent: Oct. 28, 2025

(54) SYSTEMS AND METHODS FOR OBJECT DETECTION IN SPHERICAL VIDEOS

(71) Applicant: GoPro, Inc., San Mateo, CA (US)

(72) Inventors: Amine Chadli, San Mateo, CA (US); Rawia Mhiri Ep Hakim, Lille (FR); Ralph McEntagart, Ville en Sallaz (FR); Amine Belhakimi, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/744,422

(22) Filed: Jun. 14, 2024

(51) Int. Cl.
*G06T 3/16* (2024.01)
*G06T 5/80* (2024.01)
*G06T 7/20* (2017.01)
*G06T 7/70* (2017.01)
*G06V 20/40* (2022.01)

(52) U.S. Cl.
CPC ............... *G06T 3/16* (2024.01); *G06T 5/80* (2024.01); *G06T 7/20* (2013.01); *G06T 7/70* (2017.01); *G06V 20/46* (2022.01); *G06T 2207/10016* (2013.01)

(58) Field of Classification Search
CPC ...... G06T 3/16; G06T 7/70; G06T 5/80; G06T 7/20; G06T 2207/10016; G06V 20/46
See application file for complete search history.

(56) References Cited

U.S. PATENT DOCUMENTS

2017/0339341 A1* 11/2017 Zhou ................... H04N 5/772
2018/0160119 A1*  6/2018 Su ...................... H04N 19/597

* cited by examiner

*Primary Examiner* — Girumsew Wendmagegn
(74) *Attorney, Agent, or Firm* — Esplin & Associates, PC (57) ABSTRACT

A wide field of view video is split into multiple perspective projections, with individual perspective projections providing a two-dimensional view of a spatial extent of the wide field of view video. Object detection is performed within individual perspective projections to determine the placement of the objects within individual perspective projections. The placement of the objects are projected back into the wide field of view video to merge the detections. Redundant detection are filtered out and the remaining detections are used to perform object tracking in the wide field of view video.

20 Claims, 7 Drawing Sheets

SYSTEMS AND METHODS FOR OBJECT DETECTION IN SPHERICAL VIDEOS

FIELD

This disclosure relates to detecting objects in spherical videos using multiple perspective projections of the spherical videos.

BACKGROUND

A wide field of view video may include depiction of objection. Manually framing the video to provide views of the objects may be difficult and time consuming.

SUMMARY

This disclosure relates to object detection in spherical videos. Video information and/or other information may be obtained. The video information may define a spherical video. The spherical video may have a progress length. The spherical video may include spherical visual content viewable as a function of progress through the progress length of the spherical video. Multiple perspective projections of the spherical visual content may be generated. Individual perspective projections may provide a two-dimensional view of an extent of the spherical visual content. Adjacent perspective projections may have an overlap. Object detection may be performed in the multiple perspective projections. The object detection may include identification of objects depicted within the multiple perspective projections, determination of placement of the identified objects, and generation of scores for the identified objects. The scores for the identified objects may indicate confidence of the object detection for the identified objects. A given object may be identified within a given perspective projection. The given object may be a given distance from a boundary of the given perspective projection. The given object may have a given score. One or more of the scores for the identified objects may be modified based on proximity of the identified objects to boundaries of the multiple perspective projections and/or other information. The given score for the given object may be modified based on the given distance of the given object from the boundary of the given perspective projection and/or other information.

The placement of the identified objects within the multiple perspective projections may be projected to the spherical visual content. Multiple detections of a single object within the identified objects may be identified. One or more of the multiple detections of the single object may be filtered out from the identified objects as being redundant detection based on the scores for the identified objects and/or other information. Object tracking in the spherical video may be performed based on the projected placement of the identified objects in the spherical visual content and/or other information.

A system for object detection in spherical videos may include one or more electronic storages, one or more processors, one or more electronic displays, and/or other components. An electronic storage may store video information, information relating to a video, information relating to visual content, information relating to perspective projections, information relating to object detection, information relating to objects, information relating to placement of objects, information relating to scores, information relating to redundant detections, information relating to projection of object placement, information relating to object tracking, information relating to framing of visual content, and/or other information.

The processor(s) may be configured by machine-readable instructions. Executing the machine-readable instructions may cause the processor(s) to facilitate object detection in spherical videos. The machine-readable instructions may include one or more computer program components. The computer program components may include one or more of a video information component, a perspective projection component, an object detection component, a score component, a placement projection component, a multiple detection component, a filter component, an object tracking component, and/or other computer program components.

The video information component may be configured to obtain video information and/or other information. The video information may define a spherical video. The spherical video may have a progress length. The spherical video may include spherical visual content viewable as a function of progress through the progress length of the spherical video. In some implementations, the spherical visual content may have a field of view of 360 degrees.

The perspective projection component may be configured to generate multiple perspective projections of the spherical visual content. Individual perspective projections may provide a two-dimensional view of an extent of the spherical visual content. Adjacent perspective projections may have an overlap. In some implementations, the multiple perspective projections of the spherical visual content may be generated without use of equirectangular projection.

In some implementations, six perspective projections of the spherical visual content may be generated. A given perspective projection may include a field of view of 120 to 130 degrees. A given perspective projection may not include a distortion.

The object detection component may be configured to perform object detection in the multiple perspective projections. The object detection may include identification of objects depicted within the multiple perspective projections, determination of placement of the identified objects, and generation of scores for the identified objects. The scores for the identified objects may indicate confidence of the object detection for the identified objects. A given object may be identified within a given perspective projection. The given object may be a given distance from a boundary of the given perspective projection. The given object may have a given score.

In some implementations, the placement of the identified objects may include positions and sizes of the identified objects in the multiple perspective projections.

The score component may be configured to modify one or more of the scores for the identified objects. The scores for the identified objects may be modified based on proximity of the identified objects to boundaries of the multiple perspective projections and/or other information. The given score for the given object may be modified based on the given distance of the given object from the boundary of the given perspective projection and/or other information.

The placement projection component may be configured to project the placement of the identified objects within the multiple perspective projections to the spherical visual content.

The multiple detection component may be configured to identify multiple detections of a single object within the identified objects.

The filter component may be configured to filter out one or more of the multiple detections of the single object from the identified objects as being redundant detection. One or more of the multiple detections of the single object may be filtered out from the identified objects as being redundant detection based on the scores for the identified objects and/or other information. In some implementations, one or more of the multiple detections of the single object may be filtered out from the identified objects as being redundant detection using non-maximum suppression.

The object tracking component may be configured to perform object tracking in the spherical video. The object tracking in the spherical video may be performed based on the projected placement of the identified objects in the spherical visual content and/or other information.

In some implementations, framing of the spherical visual content for presentation may be determined based on the projected placement of the identified objects in the spherical visual content and/or other information. The determination of the framing of the spherical visual content for presentation based on the projected placement of the identified objects in the spherical visual content may include placement of a viewing window for the spherical video to include one or more of the identified objects.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
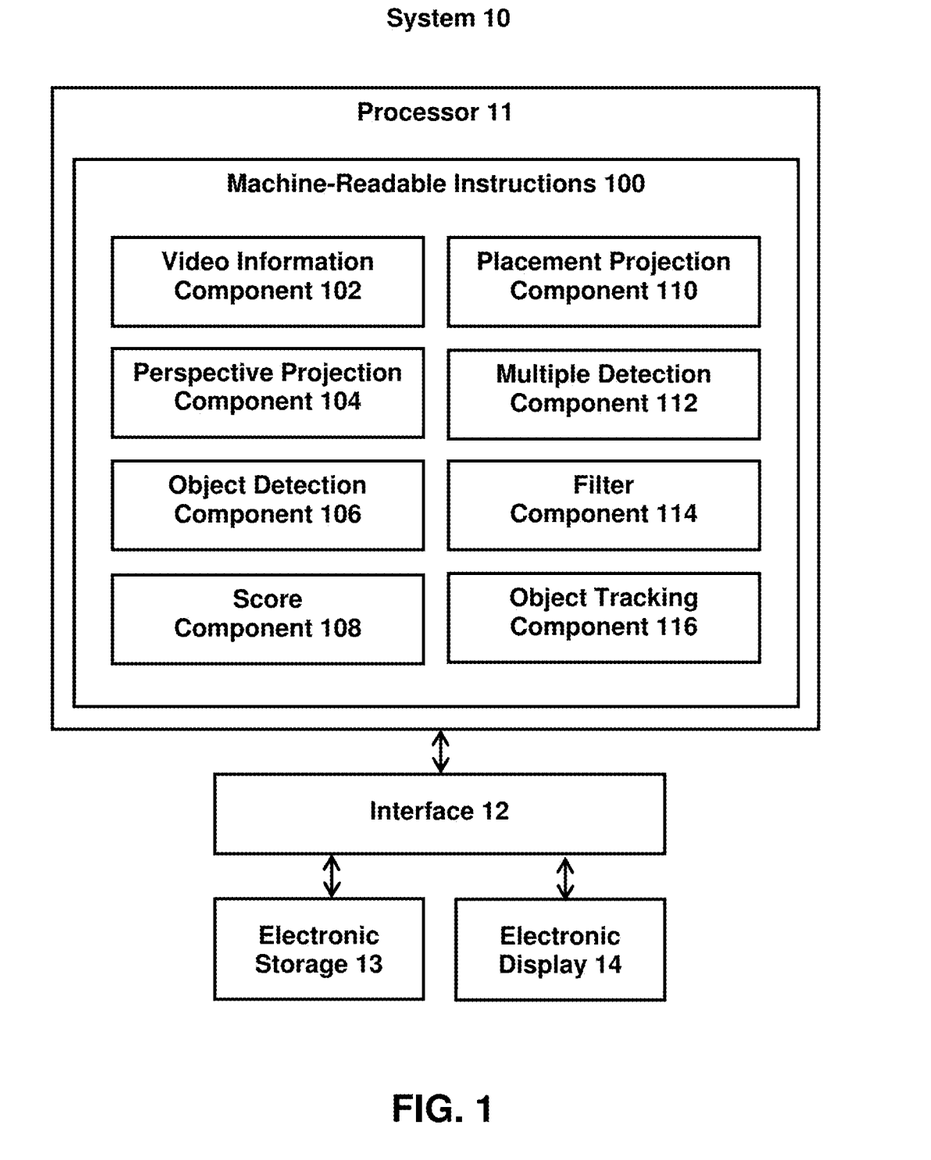
FIG. 1 illustrates an example system for object detection in spherical videos.

FIG. 1 illustrates a system 10 for object detection in spherical videos. The system 10 may include one or more of a processor 11, an interface 12 (e.g., bus, wireless interface), an electronic storage 13, an electronic display 14, and/or other components. Video information and/or other information may be obtained by the processor 11. The video information may define a spherical video. The spherical video may have a progress length. The spherical video may include spherical visual content viewable as a function of progress through the progress length of the spherical video. Multiple perspective projections of the spherical visual content may be generated by the processor 11. Individual perspective projections may provide a two-dimensional view of an extent of the spherical visual content. Adjacent perspective projections may have an overlap. Object detection may be performed in the multiple perspective projections by the processor 11. The object detection may include identification of objects depicted within the multiple perspective projections, determination of placement of the identified objects, and generation of scores for the identified objects. The scores for the identified objects may indicate confidence of the object detection for the identified objects. A given object may be identified within a given perspective projection. The given object may be a given distance from a boundary of the given perspective projection. The given object may have a given score.

Multiple detections of a single object within the identified objects may be identified by the processor 11. One or more of the scores for the identified objects may be modified by the processor 11 based on proximity of the identified objects to boundaries of the multiple perspective projections and/or other information. The given score for the given object may be modified based on the given distance of the given object from the boundary of the given perspective projection and/or other information. One or more of the multiple detections of the single object may be filtered out from the identified objects by the processor 11 as being redundant detection based on the scores for the identified objects and/or other information. The placement of the identified objects within the multiple perspective projections may be projected to the spherical visual content by the processor 11. Object tracking in the spherical video may be performed by the processor 11 based on the projected placement of the identified objects in the spherical visual content and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to visual content, information relating to perspective projections, information relating to object detection, information relating to objects, information relating to placement of objects, information relating to scores, information relating to redundant detections, information relating to projection of object placement, information relating to object tracking, information relating to framing of visual content, and/or other information.

The electronic display 14 may refer to an electronic device that provides visual presentation of information. The electronic display 14 may include a color display and/or a non-color display. The electronic display 14 may be configured to visually present information. The electronic display 14 may present information using/within one or more graphical user interfaces. For example, the electronic display 14 may present video information, information relating to a video, information relating to visual content, information relating to perspective projections, information relating to object detection, information relating to objects, information relating to placement of objects, information relating to scores, information relating to redundant detections, information relating to projection of object placement, information relating to object tracking, information relating to framing of visual content, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. The video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11, the interface 12, the electronic storage 13, and/or the electronic display 14 of the system 10 may be carried by the housing of the image capture device. The image capture device may carry other components, such as one or more optical elements and/or one or more image sensors.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet).

A video with a wide field of view (e.g., spherical video, panoramic video) may depict a large portion of a scene. The wide field of view of the video may make it difficult for a user to determine which spatial extent of the scene depicted within the video contains an interesting/salient view, such as a view including one or more objects.

The present disclosure enables accurate detection of objects depicted within a wide field of view video. A wide field of view video is split into multiple perspective projections, with individual perspective projections providing a two-dimensional view of a spatial extent of the wide field of view video. Object detection is performed within individual perspective projections to determine the placement of the objects within individual perspective projections. The placement of the objects are projected back into the wide field of view (e.g., into spherical space/projection) to merge the detections. Redundant detection are filtered out and the remaining detections are used to perform object tracking in the wide field of view video.

The processor 11 (or one or more components of the processor 11) may be configured to obtain information to facilitate object detection in spherical videos. Obtaining information may include one or more of accessing, acquiring, analyzing, capturing, determining, examining, generating, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate object detection in spherical videos. The machine-readable instructions 100 may include one or more computer program components. The machine-readable instructions 100 may include one or more of a video information component 102, a perspective projection component 104, an object detection component 106, a score component 108, a placement projection component 110, a multiple detection component 112, a filter component 114, an object tracking component 116, and/or other computer program components.

The video information component 102 may be configured to obtain video information and/or other information. In some implementations, the video component 102 may obtain video information based on user interaction with a user interface/application (e.g., video editing application, video player application), and/or other information. For example, a user interface/application may provide option(s) for a user to play and/or edit videos. The video information for a video may be obtained based on the user's selection of the video through the user interface/video application. Other selections of a video for retrieval of video information are contemplated.

The video information may define a video. The video may have a progress length. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers of videos are contemplated.

The video may include visual content viewable as a function of progress through the progress length of the video. The visual content of the video may be contained/defined/included within video frames of the video. The visual content may have a field of view. A field of view of a video/visual content may refer to a field of view of a scene captured within the video/visual content (e.g., within video frames). A field of view of a video/visual content may refer to the extent of a scene that is captured within the video/visual content.

A video may include a wide field of view video. A wide field of view video may refer to a video with a wide field of view. A wide field of view may refer to a field of view that is larger/wider than a threshold field of view/angle. For example, a wide field of view may refer to a field of view that is larger/wider than 60-degrees. In some implementations, a video may include a spherical video. A spherical video may have a spherical field of view. Spherical field of view may include 360-degrees of capture. Spherical field of view may include views in all directions surrounding the image capture device. The spherical video may include spherical visual content (visual content having spherical field of view) viewable as a function of progress through the progress length of the spherical video. Spherical field of view may include a complete sphere (a field of view of 360 degrees) or a partial sphere. Other fields of view of videos are contemplated. A wide field of view video may include and/or may be associated with spatial audio.

The visual content (video frames) of the video may depict one or more objects. An object may refer to a thing that can be seen. An object may include a living object or a non-living object. An object may include a static object (e.g., non-moving object, non-changing object) or a dynamic object (e.g., moving object, changing object). An object may refer to the entirety of a thing. For example, an object may include a person, an animal, a piece of equipment, a vehicle, a structure, a scenery, and/or other objects. An object may refer to a part of a thing. For example, an object may include a part of a person (e.g., head, face), a part of an equipment, a part of a vehicle, a part of a structure, a part of a scenery, and/or other objects.

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers.

Figure 3:
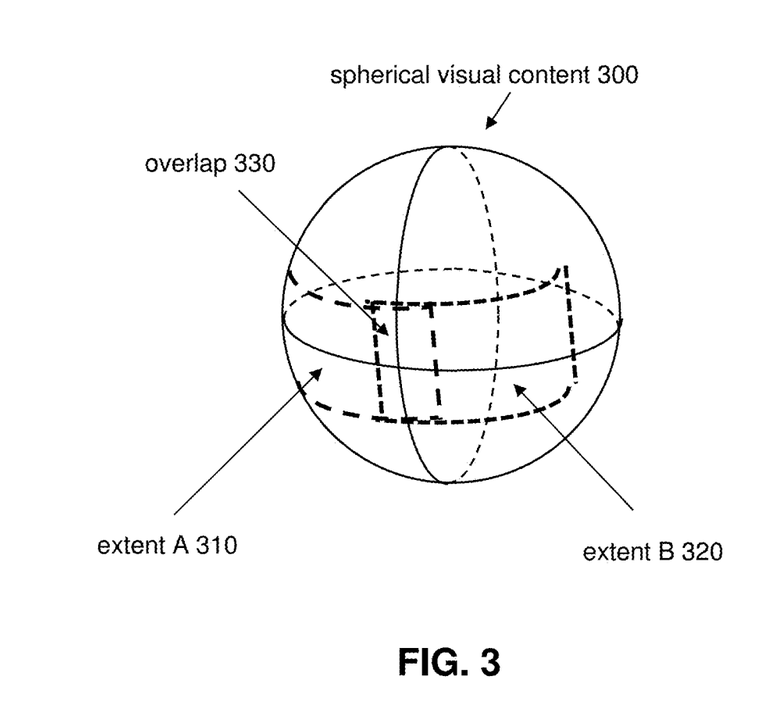
FIG. 3 illustrates an example spherical visual content.

FIG. 3 illustrates an example spherical visual content 300. There spherical visual content may have a field of view of 360 degrees. The spherical visual content 300 may be viewable from a point of view (e.g., within the sphere, center of the sphere).

The perspective projection component 104 may be configured to generate multiple perspective projections of the visual content of the video. The perspective projection component 104 may be configured to generate multiple perspective projections of the spherical visual content of the spherical video. Generating a perspective projection of visual content may include ascertaining, approximating, building, calculating, creating, determining, estimating, and/or otherwise generating the perspective projection of the visual content. A perspective projection may be generated as a perspective image.

A perspective projection of visual content may refer to mapping of one or more extents of the visual content onto a surface. A perspective projection of visual spherical content may refer to mapping of one or more extents of the spherical visual content onto a two-dimensional surface. An extent of the visual content may be mapped onto the surface so that straight lines depicted within the extent of the visual content are shown as straight lines within the perspective projection. For example, an extent of the visual content may be mapped onto the surface using rectilinear projection/projection without distortion (e.g., following a geometric camera model, such as a pinhole model).

In some implementations, the multiple perspective projections of the visual content (e.g., spherical visual content) may be generated without the use of equirectangular projection. Individual perspective projections may provide a two-dimensional view of an extent of the visual content (e.g., spherical visual content). Different perspective projections may provide views of different spatial parts of the visual content. A perspective projection may include output of a virtual camera. A virtual camera may define one or more spatial extents of the visual content based on the orientation of the virtual camera with respect to the visual content. A virtual camera may represent the point of view from which different spatial extents of the visual content are observed.

In some implementations, six perspective projections of the visual content (e.g., spherical visual content) may be generated. A given perspective projection may include a field of view of 120 to 130 degrees. A given perspective projection may not include a distortion (e.g., straight lines depicted as being straight, straight lines depicted with less than a threshold amount of curvature). Other numbers of perspective projections and other fields of view are contemplated.

Adjacent perspective projections may have one or more overlaps. The multiple perspective projections of the visual content may be generated to include overlaps between adjacent perspective projections. The fields of view of adjacent perspective projections may overlap. Multiple perspective projections may be generated for different overlapping views of the visual content. The amount of overlap between adjacent perspective projections may be fixed or changed (e.g., set as a default, changed by a user). For example, adjacent perspective projections may have an overlap of 60 degrees.

Overlaps between adjacent perspective projections may cause a single object depicted within the visual content to be detected in multiple perspective projections. An object depicted within an overlap between two adjacent perspective projections may be detected with both perspective projections.

Figure 4:
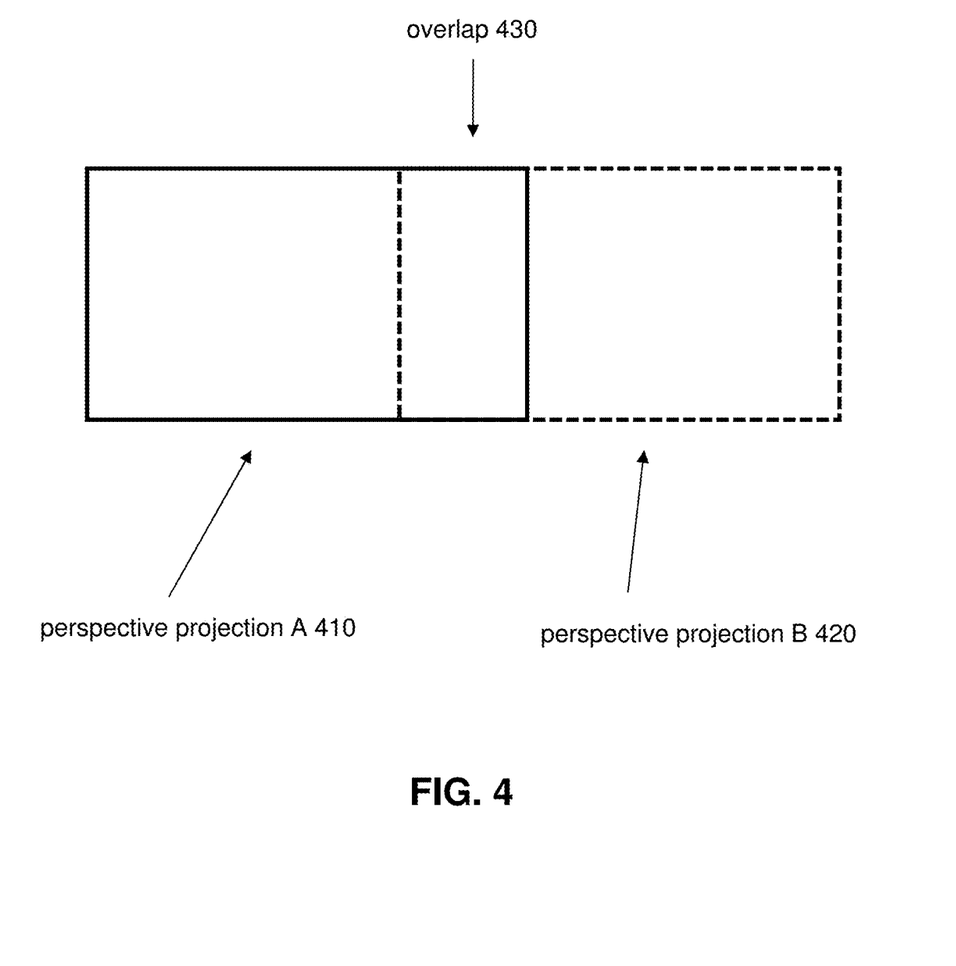
FIG. 4 illustrates example adjacent perspective projections.

For example, referring to FIG. 3, one perspective projection of the spherical visual content 300 may include an extent A 310 of the spherical visual content 300 and another perspective projection of the spherical visual content 300 may include an extent B 320 of the spherical visual content 300. The two perspective projections of the spherical visual content 300 may be adjacent to each other and include an overlap 330. FIG. 4 illustrates example adjacent perspective projections. A perspective projection A 410 may be adjacent to a perspective projection B 420. The perspective projection A 410 and the perspective projection B 420 may have an overlap 430. Other shapes of perspective projections and overlaps are completed.

The object detection component 106 may be configured to perform object detection in the multiple perspective projections. Performing object detection in a perspective projection may include executing, running, targeting, operating, using, utilizing, and/or otherwise performing the object detection in the perspective projection. Object detection may be performed in individual perspective projections. Object detection may be performed based on analysis of the visual content within the perspective projections and/or other information. Analysis of visual content may include examination, evaluation, processing, studying, and/or other analysis of the visual content. For example, analysis of visual content may include examination, evaluation, processing, studying, and/or other analysis of one or more visual features/characteristics of the visual content. For example, visual features and/or visual characteristics of the visual content within a perspective projection may be analyzed to determine whether a particular object is depicted within the perspective projection. The object detection may utilize computer vision/machine-learning, object/pattern recognition, object/pattern identification, and/or other visual analysis to detect an object depicted within the perspective projection.

The object detection may include identification of objects depicted within the multiple perspective projections, determination of placement of the identified objects, and generation of scores for the identified objects. Identification of an object depicted within a perspective projection may include classification, determination, detection, recognition, and/or other identification of the object depicted within the perspective projection. The type of the object may be identified. Determination of the placement of the identified object may include determination of positions and sizes of the identified object within the perspective projection. The outline/boundary and/or the bounding box for the object may be determined. The position of an object may refer to the location of the object within the perspective projection. For example, the center position (e.g., center pixel location of a bounding box for an object) and/or a corner position of an object (e.g., top, left corner pixel location of a bounding box for the object) may be determined. The size of an object may refer to the amount of space (e.g., in terms of pixels, in terms of angles) that is taken up by the object. For example, the height and width of the object (e.g., the pixel height and pixel width of the bounding box for the object) may be determined. In some implementations, the determination of the placement of the identified object may include determination of rotations (tilt and/or pan) of the identified objects within the perspective projection.

The scores for the identified objects may be output by the object detection. The scores for the identified objects may indicate confidence of the object detection for the identified objects. The scores for the identified objects may indicate the likelihood that the identified objects were correctly detected (e.g., correctly detected as a distinct object, correctly identified as a particular object). The identified objects may be associated with an identifier and/or other information.

One or more objects may be identified within a perspective projection. Individual objects may have a score. An identified object may have a particular score and may be a particular distance from a boundary of the perspective projection. The boundary of the perspective projection may refer to the edge of the perspective projection.

Figure 5:
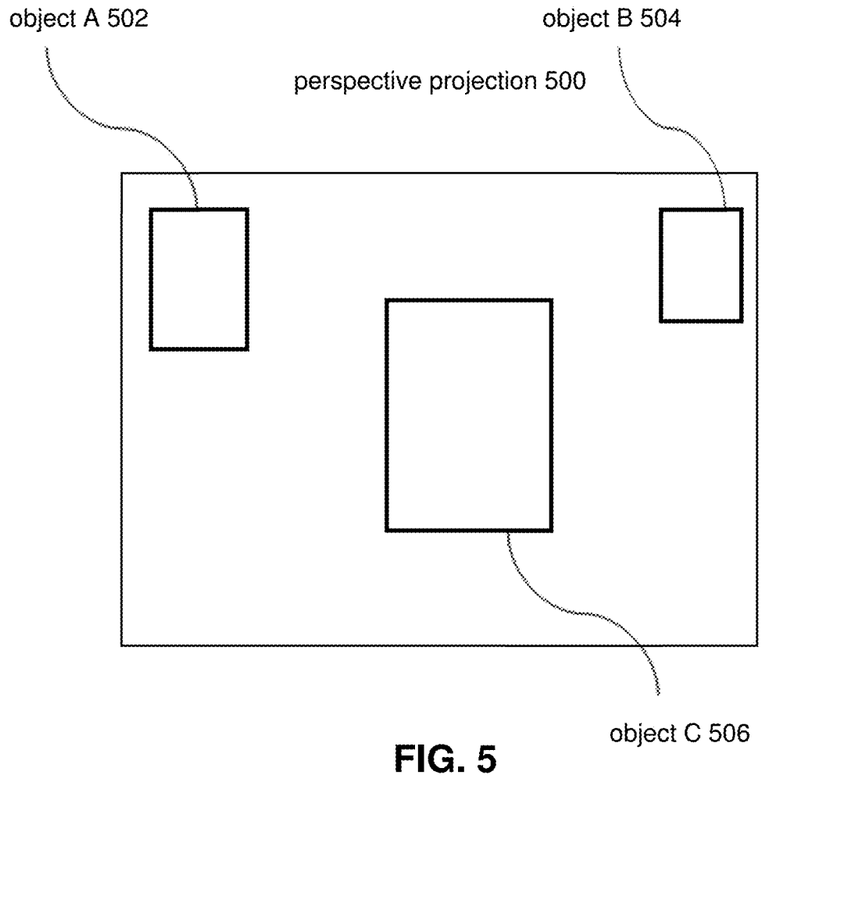
FIG. 5 illustrates example objects identified in a perspective projection.

FIG. 5 illustrates example objects 502, 504, 506 identified in a perspective projection 500. The perspective projection 500 may provide a two-dimensional view of a scene captured within the visual content. The perspective projection 500 may provide a two-dimensional view of the objects 502, 504, 506. Object detection may be performed in the perspective projection 500 to identify the objects 502, 504, 506, determine placement of the objects 502, 504, 506, and generate scores for the objects 502, 504, 506. The objects 502, 504, 506 may be at different distances from the edges of the perspective projection 500.

The score component 108 may be configured to modify one or more of the scores for the identified objects. Modifying the score for an identified object may include adjusting, altering, changing, and/or otherwise modifying the score for the identified object. The scores for the identified objects may be modified based on proximity of the identified objects to boundaries of the multiple perspective projections and/or other information. The scores for the identified objects may be modified further based on overlap with one or more other objects in the same perspective projection.

The proximity of an identified object to the boundary of the perspective projection in which the identified object is located may refer to nearness in space of the identified object from the boundary of the perspective projection. The proximity of the identified object to the boundary of the perspective projection in which the identified object is located may include the distance of the identified object from the boundary of the perspective projection. That is, the score for an identified object may be modified based on the distance of the identified object from the boundary of the perspective projection in which the identified object is located and/or other information. The distance of an identified object from the boundary of the perspective projection may be measured in number of pixels, values of angles, and/or in other ways. The distance of an identified object from the boundary of the perspective projection may be calculated as the distance between the identified object (e.g., the center of the identified object, the edge of the identified object) and the boundary of the perspective projection (e.g., the closest point on the boundary) and/or the distance between the center of the perspective projection and the identified object (e.g., the center of the identified object, the edge of the identified object).

The score(s) for the identified object(s) may be modified to add a penalty for the identified objects (e.g., bounding boxes) that are close to/on the boundary of individual perspective projections. Based on the distance of an identified object from the boundary of the perspective projection being less than a threshold distance, the score for the identified object may be modified. The score for the identified object may be modified to reduce the confidence of the object detection for the identified object. For example, based on a higher score for the identified object indicating a higher confidence that the object was correctly detected, the score for the identified object may be modified by decreasing the score. Based on a lower score for the identified object indicating a higher confidence that the object was correctly detected, the score for the identified object may be modified by increasing the score. The extent to which the score is modified may depend on how close the identified object is to the boundary. For example, the score may be modified by a greater amount the closer the identified object is to the boundary. The score(s) for the identified object(s) may be modified to add a penalty for overlapping with other object (s) in the same perspective projection. For example, greater penalty may be added for an identified object based on greater number of overlap with other objects and/or greater amount of overlap with other objects.

The placement projection component 110 may be configured to project the placement of the identified objects within the multiple perspective projections to the visual content of the video. The placement projection component 110 may be configured to project the placement of the identified objects within the multiple perspective projections to the spherical visual content of the spherical video. The placement of the identified objects within the multiple perspective projections may be projected back to the visual content by reversing the projection used to generate the multiple perspective projections.

Projecting the placement of an identified object within a perspective projection to the visual content (e.g., the field of view of the visual content, spherical space/projection) may include mapping the placement of the identified object within the perspective projection to the visual content. Projecting the placement of an identified object within a perspective projection to the visual content may include projecting the position and the size of the identified object from the perspective projection to the visual content. Projecting the placement of an identified object within a perspective projection to the visual content may include mapping the placement determined within the two-dimensional view of the perspective projection to a three-dimensional surface (e.g., a part of a sphere). For example, the bounding box for the identified object may be mapped from the two-dimensional perspective projection to the spherical visual content.

Figure 6:
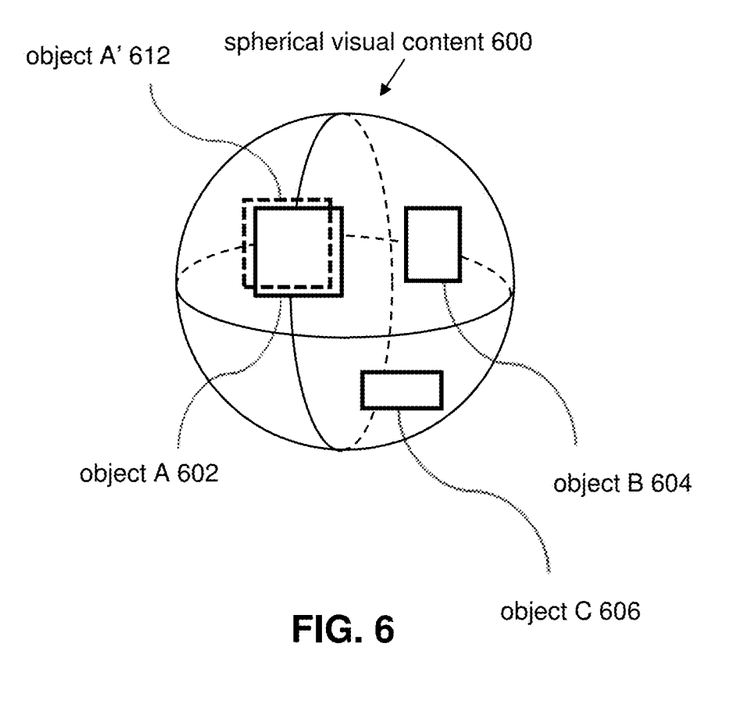
FIG. 6 illustrates an example projection of objects from perspective projections to spherical visual content.

Projecting the placement of the identified objects within the multiple perspective projections to the visual content may merge, inside the visual content, the results of object detection performed within individual perspective projections. FIG. 6 illustrates an example projection of objects from perspective projections to spherical visual content 600. Placements of the objects 602, 604, 606, 612 may be projected from multiple perspective projections back to the spherical visual content.

Overlaps between multiple perspective projections may cause a single object to be identified within multiple perspective projections. This may result in multiple placements of the single object being projected to the visual content. For example, referring to FIG. 6, the object A 602 may be detected within one perspective projection and the object A' 612 may be detected within an adjacent perspective projection. The object A 602 and the objection A' 612 may be the same object. In this case, two different placements of the same object may be projected to the spherical visual content 600.

The multiple detection component 112 may be configured to identify multiple detections of a single object within the identified objects. Identifying multiple detections of a single object may include choosing, detecting, determining, discerning, discovering, finding, marking, picking, selecting, spotting, and/or otherwise identifying the multiple detections of the single object. Multiple detections of a single object may be identified inside one or more overlaps between extents of the visual content covered by adjacent perspective projections. Multiple detections of a single object may be identified based on the identifiers associated with the identified objects, the types of the identified objects, the proximity of the identified objects, and/or other information. Multiple detections of a single object may be identified based on the identified objects having the same identifier, the identified objects being identified as the same type of object, and/or the nearness in space of the placements of the identified objects (e.g., the bounding boxes for the identified objects overlapping more than a threshold amount in the visual content, the placements of the identified objects diverging by less than a threshold among in the visual content). For example, referring to FIG. 6, the object A 602/the placement of the object A 602 and the object A' 612/the placement of the object A' 612 in the spherical visual content 600 may be identified as being multiple detections of a single object/the same object.

The filter component 114 may be configured to filter out one or more of the multiple detections of a single object from the identified objects as being redundant detection. Filtering out one of the multiple detections of a single object from the identified objects as being redundant detection may include deleting, eliminating, removing, taking out, and/or otherwise filtering out the one of the multiple detections as being redundant detection. Redundant detection of the single/same object may be removed from the visual content (e.g., the spherical visual content). Redundant placement of the single/same object may be removed from the visual content. For example, referring to FIG. 6, the detection of the object A' 612/the projected placement of the object A' 612 may be removed from the spherical visual content 600 as being redundant of the detection of the object A 602/the projected placement of the object A 602.

One or more of the multiple detections of the single object may be filtered out from the identified objects as being redundant detection based on the scores for the identified objects and/or other information. For example, detections/identified objects with lower scores or scores less than a threshold score may be selected as being redundant and filtered out. One or more of the multiple detections of the single object may be filtered out from the identified objects as being redundant detection based on the sizes for the identified objects and/or other information. For example, detections/identified objects with smaller sizes may be selected as being redundant and filtered out. One or more of the multiple detections of the single object may be filtered out from the identified objects as being redundant detection based overlap between the objects (e.g., number of overlap, amount of overlap). Other features of the detections/identified objects may be used to identify and filter out redundant detection. Multiple criteria may be used to identify and filter out redundant detection.

In some implementations, one or more of the multiple detections of the single object may be filtered out from the identified objects as being redundant detection using non-maximum suppression (e.g., in spherical space). The scores for the identified objects, the sizes of the identified objects, and/or other features of the identified objects may be used as input for non-maximum suppression in filtering out redundant detection.

The object tracking component 116 may be configured to perform object tracking in the video (e.g., the spherical video). Object tracking may include tracking the identified objects in the video. Object tracking may include tracking of the projected placement (e.g., projected positions and sizes) of the identified objects in the visual content (e.g., the spherical visual content). Object tracking may include tracking of the projected placement of the identified objects in/across multiple video frames. The placement of the identified object projected from the multiple perspective projections to the visual content may be used to track the identified objects through the video.

The object tracking in the video may be performed based on the projected placement of the identified objects in the visual content and/or other information. The object tracking in the spherical video may be performed based on the projected placement of the identified objects in the spherical visual content and/or other information. The object tracking in a particular video frame (e.g., visual content at a moment in the progress length of the video) may be performed based on the projected placement of the identified objects in the particular video frame. For example, the generation of multiple perspective projections, performing object detection, modification of scores, and projection of the placement of identified objects may be performed for individual video frames, and the frame-by-frame analysis may be used to track the objects in the video. The object tracking in a particular video frame may be performed based on the projected placement of the identified objects in one or more other video frames (e.g., one or more preceding video frames, one or more subsequent video frames). For example, the generation of multiple perspective projections, performing object detection, modification of scores, and projection of the placement of identified objects may be performed for some of the video frames, and interpolation/persistence of analysis results may be used to track objects in other video frames.

In some implementations, framing of the visual content (spherical visual content) for presentation may be determined based on the projected placement of the identified objects in the visual content (e.g., visual content) and/or other information. For example, the visual content may be framed based on where and how the objects are depicted in the visual content, as indicated by the projected placement of the identified objects. The projected placement of the identified objects may be used to automatically frame the visual content. The projected placement of the identified objects may be provided to a user (through one or more options presented on a graphical user interface) for selection by the user to frame the video.

The framing of the visual content (video) for presentation may refer to how the visual content/video frames of the video is manipulated for presentation and/or included in a video clip. The framing of the visual content may define positioning of a viewing window for the visual content/video frames within the video. The framing of the visual content may define where and how the viewing window is placed within the field of view of the visual content/video frames.

A viewing window may define the extents of the visual content/video frames to be included within a presentation of the video and/or included within a video clip. A viewing window may define extents of the visual content/video frames to be included within a punchout of the visual content/video frames. A punchout of visual content/video frames may refer to an output of one or more portions of the visual content/video frames for presentation (e.g., current presentation, future presentation based on video generated using the punchout). A punchout of the visual content/video frames may refer to extents of the visual content/video frames that is obtained for viewing and/or extraction. The extents of the visual content/video frames viewable/extracted within the viewing window may be used to provide views of different spatial parts of the visual content/video frames.

A punchout of visual content/video frames may include output of a virtual camera. A virtual camera may define one or more spatial extents of the visual content/video frames to be output (e.g., for presentation, for storage) based on orientation of the virtual camera with respect to the visual content/video frames of the video. A virtual camera may represent the point of view from which different spatial extents of the visual content/video frames are observed. Different punchouts of the visual content/video frames may include outputs of different virtual cameras to provide views of differential spatial parts of the visual content/video frames.

Positioning of a viewing window within the field of view of the visual content may refer to placement of the viewing window within the field of view of the visual content/video frames. The positioning/placement of the viewing window may be defined by one or more of viewing direction, viewing size, viewing rotation, and/or other information. Individual framing of the visual content/video frames may define (e.g., determine, establish, include, set) positioning of the viewing window within the field of view of the visual content/video frames based on the corresponding viewing direction, viewing size, viewing rotation, and/or other information. An individual framing of the visual content/video frames may define arrangement of pixels within the viewing window for presentation. The arrangement of the pixels within the viewing window may be defined by viewing projection and/or other information. Individual framing of the visual content/video frames may define corresponding viewing projection of the visual content/video frames within the viewing window.

A viewing direction may define a direction of view for a viewing window. A viewing direction may define the angle/visual portion of the visual content/video frame at which a viewing window may be directed. A viewing size may define the size of the viewing window. A viewing size may define a size (e.g., size, magnification, viewing angle) of viewable extents of visual content/video frame within the viewing window. A viewing size may define the dimension/shape of the viewing window. A viewing rotation may define a rotation of the viewing window. A viewing rotation may define one or more rotations of the viewing window about one or more axis. A viewing projection may define how pixels within the viewing window is arranged for presentation on an electronic display. A viewing projection may define how the pixels of an image are arranged to form the visual content. A viewing projection may refer to how portions of the visual content/video frame are mapped onto a surface (e.g., two-dimensional plane).

In some implementation, the determination of the framing of the visual content for presentation based on the projected placement of the identified objects in the visual content may include placement of a viewing window for the video to include one or more of the identified objects.

Figure 7:
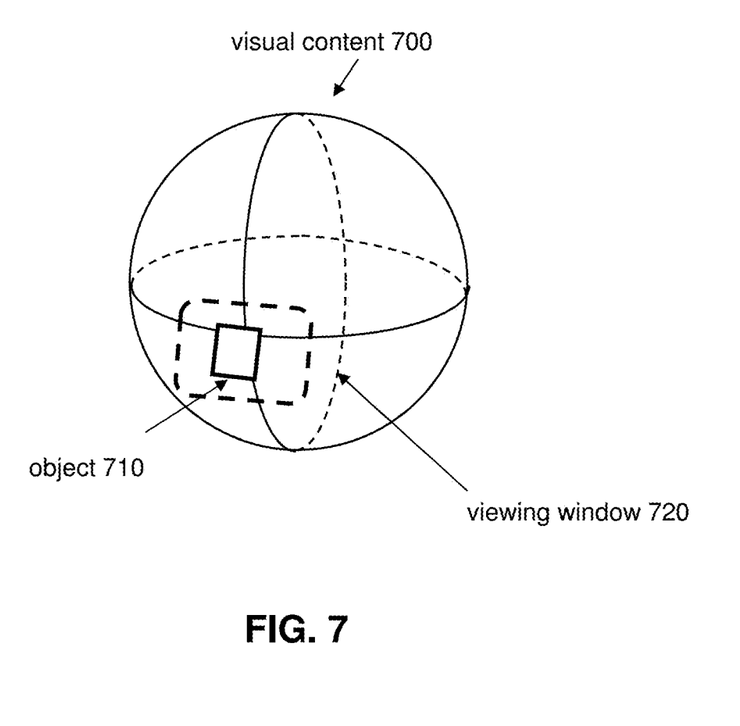
FIG. 7 illustrates an example framing of visual content.

The viewing window may be positioned within the video frames to include one or more of the identified objects. The viewing window may be positioned within the video frames to include one or more of the identified objects at the center of the viewing window, within a center region of the viewing window, at other points of the viewing window, and/or within other region of the viewing window. For example, FIG. 7 illustrates an example framing of visual content 700 based on the projection placement of an object 710. A viewing window 720 may be placed within the visual content 700 to include the object 710 within the viewing window 720. The viewing window 720 may be positioned to include the object 710 at the center/in the center area of the viewing window 720 or at other positions in the viewing window 720. Other framing of visual content are contemplated.

In some implementations, determination of the framing of the visual content may include determination of a viewing direction for the viewing window within the visual content. The identified object(s) within the visual content (e.g., location and/or size of the identified object(s)) may be used to determine the viewing direction for the video frame. The identified object(s) within the visual content may be used to determine the direction of placement for the viewing window within the visual content.

In some implementations, determination of the framing of the visual content may further include determination of a viewing size for the viewing window within the visual content. Information relating to the identified object(s) within the visual content may be used to determine how much of the field of view of the visual content will be included within the viewing window.

The framing of the visual content may be used to generate a presentation of the video. The presentation of the video may include the entire progress length of the video or one or more parts of the progress length of the video. In some implementations, the temporal parts of the video in which the object(s) are identified may be included in the presentation. In some implementations, the temporal parts of the video in which the object(s) are not identified may be included in the presentation. For example, the framing of the video may show the identified object(s) when the object(s) are present. The framing of the video may move towards the location of the next object(s) when the object(s) are not present.

The visual content/video frames of the video within the viewing window may be presented on one or more electronic displays. The visual content/video frames of the video within the viewing window may be used to generate a video clip (e.g., 2D video, video summary, video edit). The video clip may be stored in the electronic storage 13.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of the computer program components may provide more or less functionality than is described. For example, one or more of the computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
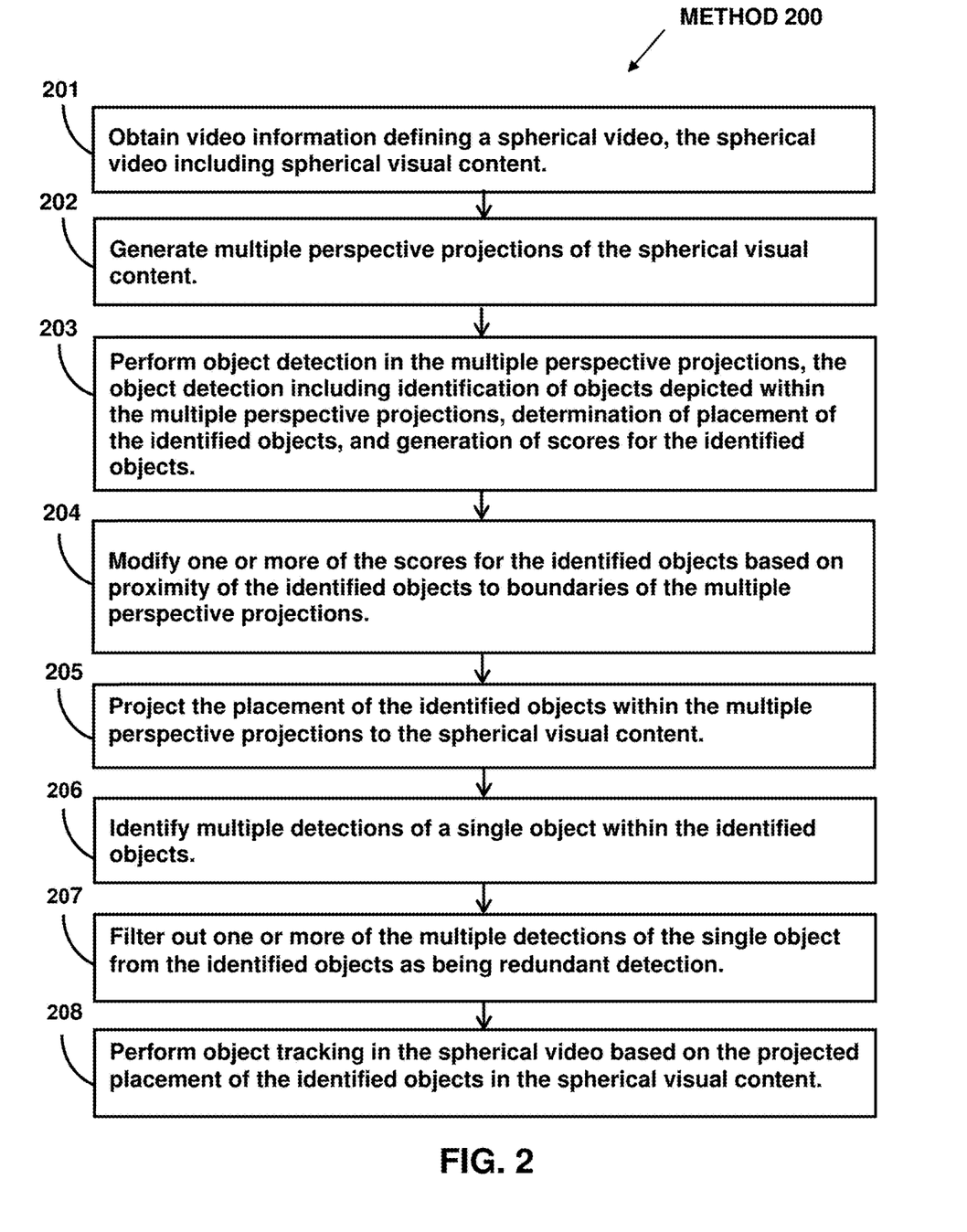
FIG. 2 illustrates an example method for object detection in spherical videos.

FIG. 2 illustrates method 200 for object detection in spherical videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a spherical video. The spherical video may have a progress length. The spherical video may include spherical visual content viewable as a function of progress through the progress length of the spherical video. In some implementations, operation 201 may be performed by a processor component the same as or similar to the video information component 102 (Shown in FIG. 1 and described herein).

At operation 202, multiple perspective projections of the spherical visual content may be generated. Individual perspective projections may provide a two-dimensional view of an extent of the spherical visual content. Adjacent perspective projections may have an overlap. In some implementations, operation 202 may be performed by a processor component the same as or similar to the perspective projection component 104 (Shown in FIG. 1 and described herein).

At operation 203, object detection may be performed in the multiple perspective projections. The object detection may include identification of objects depicted within the multiple perspective projections, determination of placement of the identified objects, and generation of scores for the identified objects. The scores for the identified objects may indicate confidence of the object detection for the identified objects. A given object may be identified within a given perspective projection. The given object may be a given distance from a boundary of the given perspective projection. The given object may have a given score. In some implementations, operation 203 may be performed by a processor component the same as or similar to the object detection component 106 (Shown in FIG. 1 and described herein).

At operation 204, one or more of the scores for the identified objects may be modified based on proximity of the identified objects to boundaries of the multiple perspective projections and/or other information. The given score for the given object may be modified based on the given distance of the given object from the boundary of the given perspective projection and/or other information. In some implementations, operation 204 may be performed by a processor component the same as or similar to the score component 108 (Shown in FIG. 1 and described herein).

At operation 205, the placement of the identified objects within the multiple perspective projections may be projected to the spherical visual content. In some implementations, operation 205 may be performed by a processor component the same as or similar to the placement projection component 110 (Shown in FIG. 1 and described herein).

At operation 206, multiple detections of a single object within the identified objects may be identified. In some implementations, operation 206 may be performed by a processor component the same as or similar to the multiple detection component 112 (Shown in FIG. 1 and described herein).

At operation 207, one or more of the multiple detections of the single object may be filtered out from the identified objects as being redundant detection based on the scores for the identified objects and/or other information. In some implementations, operation 207 may be performed by a processor component the same as or similar to the filter component 114 (Shown in FIG. 1 and described herein).

At operation 208, object tracking in the spherical video may be performed based on the projected placement of the identified objects in the spherical visual content and/or other information. In some implementations, operation 208 may be performed by a processor component the same as or similar to the object tracking component 116 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for object detection in spherical videos, the system comprising:

one or more physical processors configured by machine-readable instructions to:

obtain video information defining a spherical video, the spherical video having a progress length, the spherical video including spherical visual content viewable as a function of progress through the progress length, wherein the spherical visual content has a field of view of 360 degrees;

generate multiple perspective projections of the spherical visual content, individual perspective projections providing a two-dimensional view of an extent of the spherical visual content, adjacent perspective projections having an overlap, wherein the multiple perspective projections of the spherical visual content are generated without use of equirectangular projection;

perform object detection in the multiple perspective projections, the object detection including identification of objects depicted within the multiple perspective projections, determination of placement of the identified objects, and generation of scores for the identified objects, the scores for the identified objects indicating confidence of the object detection for the identified objects, the placement of the identified objects including positions and sizes of the identified objects in the multiple perspective projections wherein a given object is identified within a given perspective projection, the given object being a given distance from a boundary of the given perspective projection, the given object having a given score;

modify one or more of the scores for the identified objects based on proximity of the identified objects to boundaries of the multiple perspective projections, wherein the given score for the given object is modified based on the given distance of the given object from the boundary of the given perspective projection;

project the placement of the identified objects within the multiple perspective projections to the spherical visual content;

identify multiple detections of a single object within the identified objects;

filter out one or more of the multiple detections of the single object from the identified objects as being redundant detection based on the scores for the identified objects; and perform object tracking in the spherical video based on the projected placement of the identified objects in the spherical visual content.

2. The system of claim 1, wherein:

six perspective projections of the spherical visual content are generated, the given perspective projection including a field of view of 120 to 130 degrees;

the one or more physical processors are further configured by the machine-readable instructions to determine framing of the spherical visual content for presentation based on the projected placement of the identified objects in the spherical visual content; and the determination of the framing of the spherical visual content for presentation based on the projected placement of the identified objects in the spherical visual content includes placement of a viewing window for the spherical video to include one or more of the identified objects.

3. A system for object detection in spherical videos, the system comprising:

one or more physical processors configured by machine-readable instructions to:

obtain video information defining a spherical video, the spherical video having a progress length, the spherical video including spherical visual content viewable as a function of progress through the progress length;

generate multiple perspective projections of the spherical visual content, individual perspective projections providing a two-dimensional view of an extent of the spherical visual content, adjacent perspective projections having an overlap;

perform object detection in the multiple perspective projections, the object detection including identification of objects depicted within the multiple perspective projections, determination of placement of the identified objects, and generation of scores for the identified objects, the scores for the identified objects indicating confidence of the object detection for the identified objects, wherein a given object is identified within a given perspective projection, the given object being a given distance from a boundary of the given perspective projection, the given object having a given score;

modify one or more of the scores for the identified objects based on proximity of the identified objects to boundaries of the multiple perspective projections, wherein the given score for the given object is modified based on the given distance of the given object from the boundary of the given perspective projection;

project the placement of the identified objects within the multiple perspective projections to the spherical visual content;

identify multiple detections of a single object within the identified objects;

filter out one or more of the multiple detections of the single object from the identified objects as being redundant detection based on the scores for the identified objects; and perform object tracking in the spherical video based on the projected placement of the identified objects in the spherical visual content.

4. The system of claim 3, wherein the multiple perspective projections of the spherical visual content are generated without use of equirectangular projection.

5. The system of claim 3, wherein the placement of the identified objects includes positions and sizes of the identified objects in the multiple perspective projections.

6. The system of claim 3, wherein the one or more physical processors are further configured by the machine-readable instructions to determine framing of the spherical visual content for presentation based on the projected placement of the identified objects in the spherical visual content.

7. The system of claim 6, wherein the determination of the framing of the spherical visual content for presentation based on the projected placement of the identified objects in the spherical visual content includes placement of a viewing window for the spherical video to include one or more of the identified objects.

8. The system of claim 3, wherein the one or more of the multiple detections of the single object are filtered out from the identified objects as being redundant detection using non-maximum suppression.

9. The system of claim 3, wherein six perspective projections of the spherical visual content are generated, the given perspective projection including a field of view of 120 to 130 degrees.

10. The system of claim 3, wherein the given perspective projection does not include a distortion.

11. The system of claim 3, wherein the spherical visual content has a field of view of 360 degrees.

12. A method for object detection in spherical videos, the method performed by a computing system including one or more processors, the method comprising:

obtaining, by the computing system, video information defining a spherical video, the spherical video having a progress length, the spherical video including spherical visual content viewable as a function of progress through the progress length;

generating, by the computing system, multiple perspective projections of the spherical visual content, individual perspective projections providing a two-dimensional view of an extent of the spherical visual content, adjacent perspective projections having an overlap;

performing, by the computing system, object detection in the multiple perspective projections, the object detection including identification of objects depicted within the multiple perspective projections, determination of placement of the identified objects, and generation of scores for the identified objects, the scores for the identified objects indicating confidence of the object detection for the identified objects, wherein a given object is identified within a given perspective projection, the given object being a given distance from a boundary of the given perspective projection, the given object having a given score;

modifying, by the computing system, one or more of the scores for the identified objects based on proximity of the identified objects to boundaries of the multiple perspective projections, wherein the given score for the given object is modified based on the given distance of the given object from the boundary of the given perspective projection;

projecting, by the computing system, the placement of the identified objects within the multiple perspective projections to the spherical visual content;

identifying, by the computing system, multiple detections of a single object within the identified objects;

filtering out, by the computing system, one or more of the multiple detections of the single object from the identified objects as being redundant detection based on the scores for the identified objects; and performing, by the computing system, object tracking in the spherical video based on the projected placement of the identified objects in the spherical visual content.

13. The method of claim 12, wherein the multiple perspective projections of the spherical visual content are generated without use of equirectangular projection.

14. The method of claim 12, wherein the placement of the identified objects includes positions and sizes of the identified objects in the multiple perspective projections.

15. The method of claim 12, further comprising determining, by the computing system, framing of the spherical visual content for presentation based on the projected placement of the identified objects in the spherical visual content.

16. The method of claim 15, wherein determining the framing of the spherical visual content for presentation based on the projected placement of the identified objects in the spherical visual content includes placing a viewing window for the spherical video to include one or more of the identified objects.

17. The method of claim 12, wherein the one or more of the multiple detections of the single object are filtered out from the identified objects as being redundant detection using non-maximum suppression.

18. The method of claim 12, wherein six perspective projections of the spherical visual content are generated, the given perspective projection including a field of view of 120 to 130 degrees.

19. The method of claim 12, wherein the given perspective projection does not include a distortion.

20. The method of claim 12, wherein the spherical visual content has a field of view of 360 degrees.

* * * * *